Nov. 5, 1935.　　　　J. D. SPALDING　　　　2,019,739
ROTARY MACHINE
Filed Jan. 15, 1934　　　　4 Sheets-Sheet 1
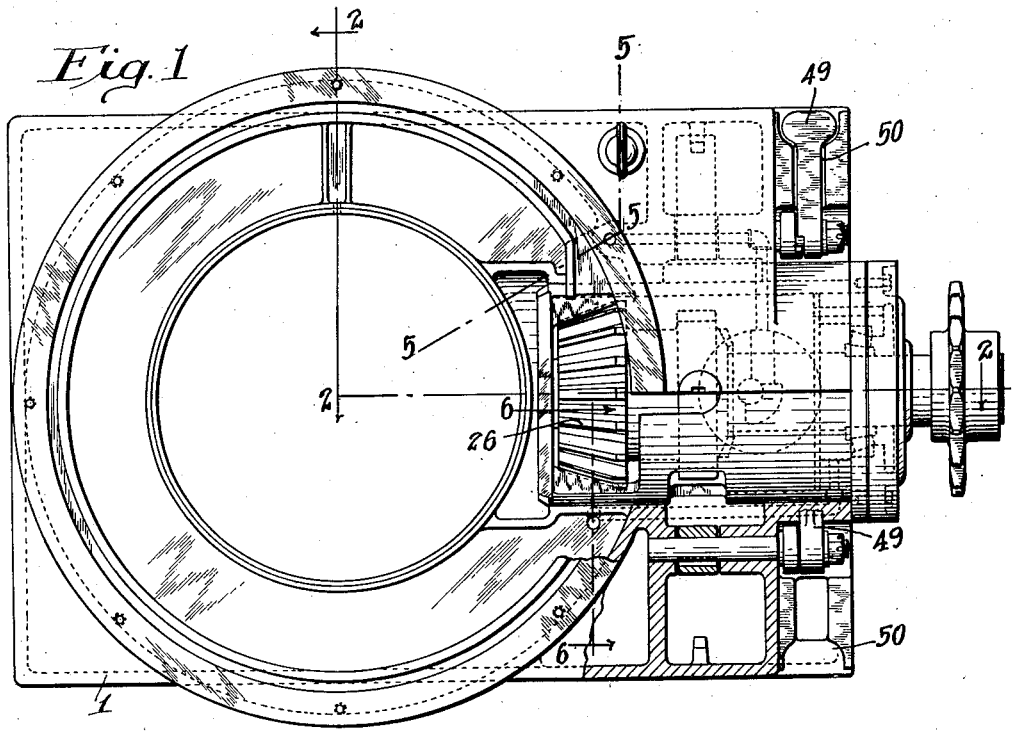
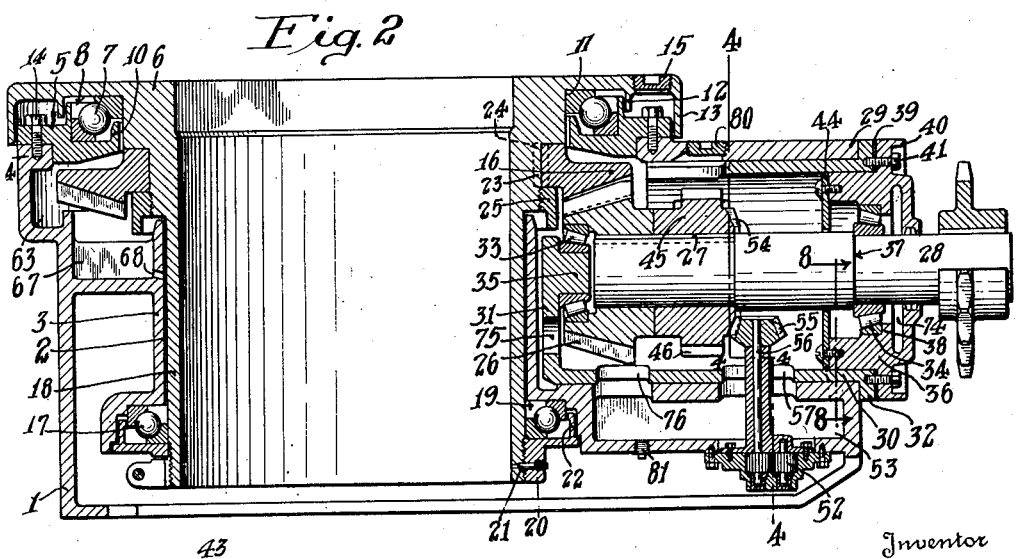

Nov. 5, 1935.  J. D. SPALDING  2,019,739
ROTARY MACHINE
Filed Jan. 15, 1934    4 Sheets-Sheet 2

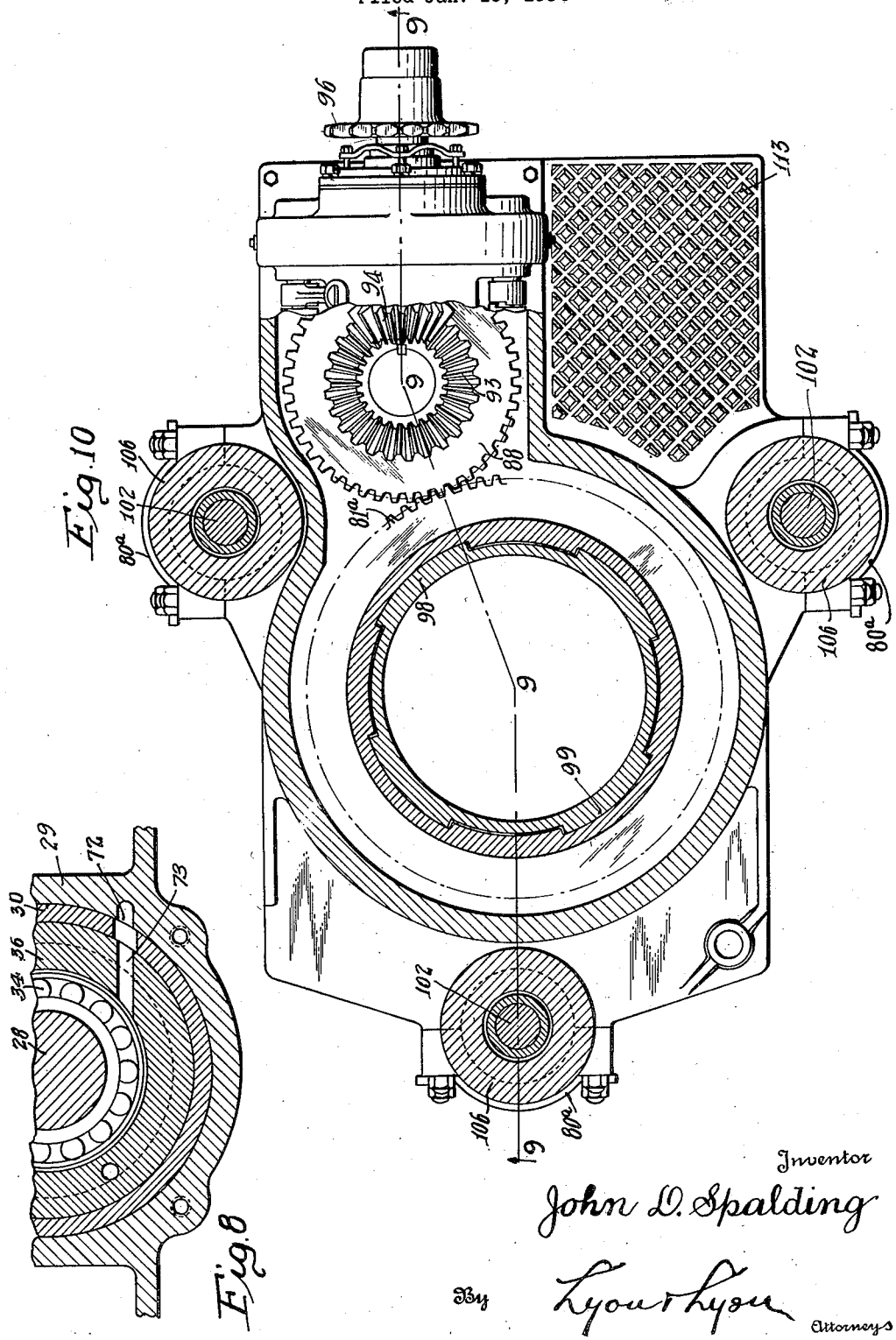

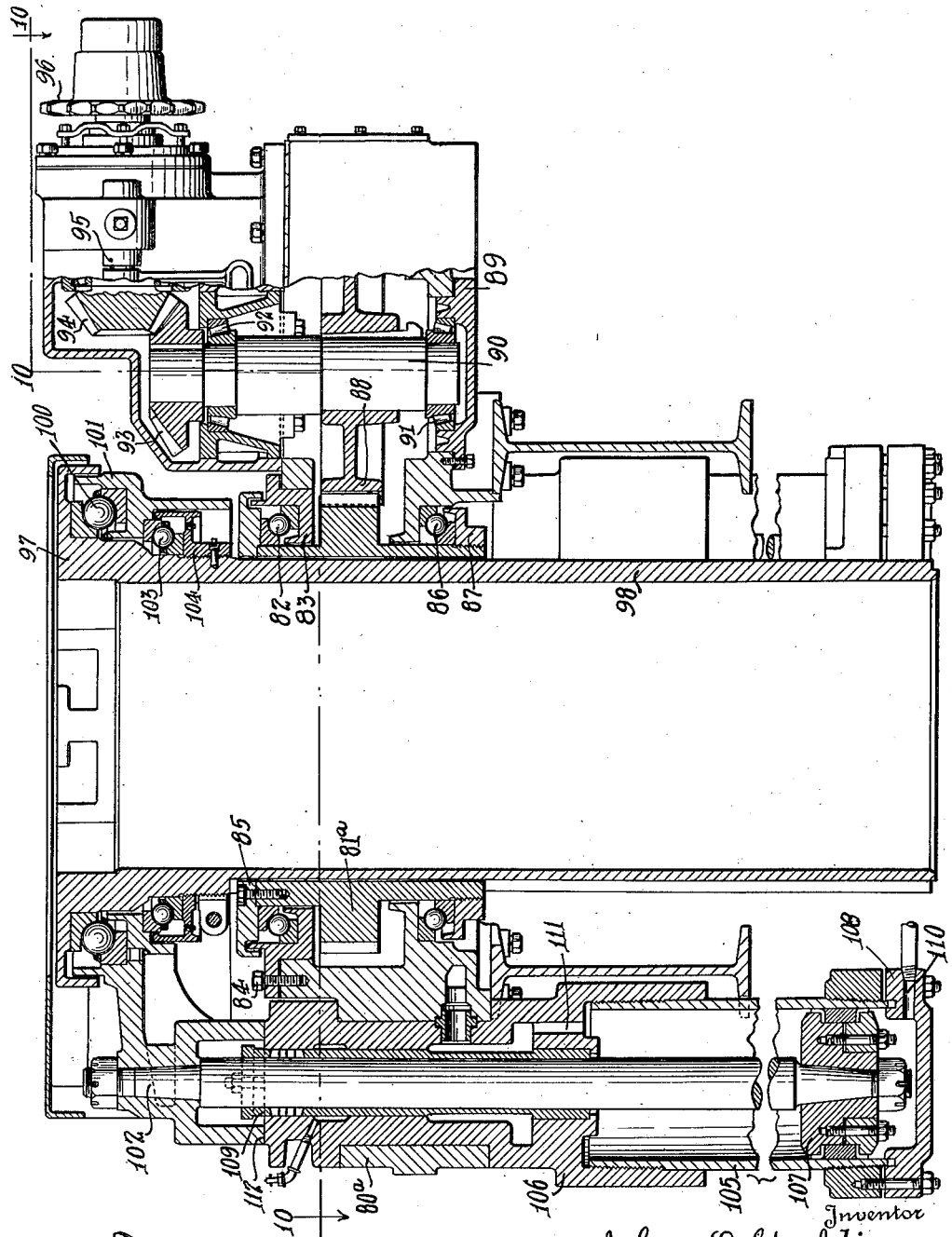

Patented Nov. 5, 1935

2,019,739

UNITED STATES PATENT OFFICE 2,019,739

ROTARY MACHINE

John D. Spalding, Los Angeles, Calif., assignor to The National Superior Company, Toledo, Ohio, a corporation of Delaware Application January 15, 1934, Serial No. 706,654

26 Claims. (Cl. 255—23)

This invention relates to rotary machines, and more particularly to a rotary drilling machine of the type employed in connection with the drilling of oil, gas, water, or other wells.

An object of this invention is to provide a rotary machine including a base and a table and which includes bearing means interposed between the base and the table consisting of a pair of such bearing means spaced apart in a manner to effectively compensate for the loads imposed upon such a rotary machine and to hold the table in position within the base both against forces tending to thrust the table upwardly from the base and to carry the loads as imposed upon the table during drilling operations.

Another object of this invention is to provide a rotary machine including a base and a table in which rotary machine there is provided a main supporting bearing and an upthrust bearing, and in which rotary machine the main and upthrust bearings are positioned between the table and the base upon opposite sides, that is, above and below the gear means provided for rotating the table relative to the base.

Another object of this invention is to provide a rotary table including a base and a table in which there is provided a bearing supporting means for the table as it is positioned relative to the base, which supporting bearing means are positioned between the table and the base above the gear means which are provided to drive the table relative to the base and are so proportioned as to be confined within a protecting chamber of a diameter less than the diameter of the table.

Another object of this invention is to provide a rotary machine including a base and a table and a pinion shaft assembly in which the pinion shaft and pinion are supported intermediately of a pair of spaced bearings so as to obtain increased bearing centers over the conventional design of rotary machine, and in which there is therefore provided a more substantial mounting for the pinion shaft resulting in a reduction of bearing loads.

Another object of this invention is to provide a rotary machine including a base and table, bearing means for supporting the table with reference to the base, and a means for driving the table with reference to the base in which there is provided an improved form of lubricating means for the lubrication of the bearings and gears from a supply source of lubricant contained within the base.

Other objects and advantages of this invention it is believed will be apparent from the following detailed description of a preferred embodiment thereof as illustrated in the accompanying drawings.

In the drawings:

Figure 1 is a top plan view of a rotary machine embodying my invention partly in horizontal cross section with the rotary table removed.

Figure 2 is a cross sectional view of the rotary machine with the table in position and taken substantially on the line 2—2—2 of Figure 1.

Figure 3 is an end elevation of a rotary machine embodying my invention looking toward the pinion shaft end of the rotary machine.

Figure 4 is a vertical sectional view of a rotary machine taken substantially on the line 4—4—4—4 of Figure 2.

Figure 5 is a fragmental sectional view taken substantially on the line 5—5—5 of Figure 1.

Figure 6 is an enlarged fragmental view taken substantially on the line 6—6 of Figure 1.

Figure 7 is a fragmental sectional view taken substantially on the line 7—7 of Figure 3.

Figure 8 is an enlarged fragmental sectional view taken substantially on the line 8—8 of Figure 2.

Figure 9 is a vertical sectional elevation illustrating my invention as adapted to a hydraulically operated rotary machine and taken substantially on the line 9—9—9—9 of Figure 10.

Figure 10 is a horizontal sectional view of the rotary machine illustrated in Figure 9 and taken substantially on the line 10—10—10 of Figure 9.

The rotary machine embodying my invention includes a base 1 having a vertical opening 2 defined by a sleeve 3 formed integrally with the base. The upper portion of the base 1 is formed to provide a flange 4 upon which a main bearing supporting means 5 is supported and secured. A rotary table 6 is rotatably supported by means of main supporting bearings 7 interposed between the bearing supporting ring 5, the table 6 and positioned within a main supporting bearing chamber 8 formed by recessing the under portion of the table 6 and by forming the bearing supporting ring 5 with upstanding annular flanges 9 and 10. The chamber 8 is defined within the table 6 by the inner wall 11 and a downwardly depending wall 12 formed to fit over the upstanding annular flange 9 of the bearing supporting ring 5. The table 6 is formed with a downwardly depending outer wall 13 which projects over the outer edge of the bearing supporting ring 5 so that the introduction of mud-laden fluid or other foreign matter into the supporting bearing 7 is prevented by the labyrinth path provided between the outer periphery of the bearing ring 5 and the inner periphery of the wall 13 and the very narrow passage provided between the adjacent walls of the annular flanges 9 and 12.

I prefer to form the ring 5 separately and secure the same in position upon the flange 4 of the base 1 by means of cap screws 14. Access to the cap screws 14 may be had through a cap hole formed in the upper surface of the rotary table and normally closed by means of the cap 15. The main supporting bearing 7 is thus positioned near the upper surface of the rotary table 6 above the gear ring 16 and at such a position as compared with the common form of rotary table heretofore constructed as to move the bearing 7 away from the upthrust bearing 17 a greater distance so that the longitudinal spacing of the bearings 7 and 17 with reference to the table 1 is increased as far as possible so that greater bearing efficiency may be had than where the said bearings are closely spaced together, particularly in taking the radial thrust imposed upon such bearings tending to tilt the rotary table 6 with reference to the base 1. The upthrust bearing 17 is positioned between the cylindrical skirt 18 of the table 6 near the lower end of the skirt 18 and in an annular recess 19 formed in the under portion of the base 1. The bearing 7 when thus positioned, may be made of such diameter as to be substantially equal to the diameter of the gear ring 14 and need not be increased to such diameter as to cause the peripheral speeds of the ball or roller elements of the bearings to be excessive.

The upthrust bearing 17 is supported in the chamber 19 upon the upthrust bearing supporting ring 20 which is adjustably threaded to the lower end of the skirt 18 and held in the proper adjusted position by means of a lock pin 21. The adjustment thus provided permits of adjustment of the bearing clearance for both of the bearings 7 and 17 so that said bearings may properly operate. The upthrust bearing ring 20 is provided with an outer circumferential flange 22 which fits closely within the recess 19 in a manner to prevent the admission of rotary mud or other foreign matter into the upthrust bearing 17 and likewise so as to provide a lubricant chamber around the upthrust bearing 17 to retain lubricant so that the bearing 17 may at all times operate in a lubricant.

In order to drive the rotary table with reference to the base, the gear ring 16 is provided. The gear ring 16 is passed onto the gear ring portion 23 of the rotary table 6 below the main supporting bearing 7 and is held in position by means of a key 24. The gear ring 16 is held in position by means of a lock ring 25 which is threadedly secured to the portion 23 of the table 6.

The rotary table 6 is driven with reference to the base 1 by means of a pinion 26 which is secured by means of a key 27 to a pinion shaft 28. The pinion shaft 28, pinion 26, and the supporting bearings for the pinion shaft 28, are formed as a unit assembly which are adapted to be positioned within the horizontal bore formed through the outwardly extending integral portion 29 of the base 1. The unit pinion shaft assembly includes a sleeve 30 which fits within the bore of the portion 29 of the base 1 and is provided at its inner end with an upwardly extending bearing supporting portion 31 and at its outer end with a securing flange 32.

Positioned within the sleeve 30 are supporting bearings 33 and 34 by which the pinion shaft 28 is journaled within the sleeve 30. The inner bearing 33 is supported on a trunnion 35 which is formed integrally with the upstanding portion 31 of the sleeve 30. Bearing 33 mounted on the trunnion 35 extends into a recess formed in the end of the pinion 26 to support the pinion 26 and hence the pinion shaft 28 at its innermost end. The outer bearing 34 is mounted within a bearing retainer 36 at the outer edge of the sleeve 30 so that the said bearing 34 is spaced as far as possible from the inner bearing 33 to provide for greater bearing efficiency. Bearing 34 is fitted upon a reduced portion of the shaft 28 adjacent the thrust shoulder 37 and between the shoulder 37 and the thrust shoulder 38 formed internally of the bearing retainer 36.

In order to position the pinion 26 properly with respect to the gear ring 16 to accommodate for the end thrust imposed upon the pinion 26, the outer bearing 34 is a combination radial end thrust bearing and the outer bearing 34 is adjusted longitudinally with the pinion shaft 28 by means of shims 39 which are interposed between the end flange 32 of the sleeve 30 and the outer cap face 40 of the bearing retainer 36. The bearing retainer 36 is secured to the bearing sleeve 30 by means of cap screws 41 and the unitary pinion shaft assembly is secured in position within the bore of the bearing portion 29 by means of cap screws 42 (Figure 7), which pass through bores formed in the cap face 40, flange of the sleeve 30, and are threaded into the end of the portion 29 of the base 1 as indicated at 43. The bearing 34 is confined within a bearing chamber defined by the outer cap face 40 of the bearing retainer 36 and a plate 44 which is secured to the inner end of the bearing retainer 36 through which plate shaft 28 is extended.

In order to hold the rotary table 6 from rotation upon the base 1 when desired, a lock ring 45 is keyed to the shaft 28 by means of the key 27. The lock ring 45 is provided with lock lugs 46 which are adapted to be engaged by lock pawls 47 which are mounted within the enclosure formed by the outwardly extending portion 29 of the base 1 and are adapted to pass through openings formed in the sleeve 30 to engage the lock lugs 46 formed on the outer periphery of the lock ring 45. The locking pawls 47 are mounted on shafts 48 which extend outwardly to the exterior of the enclosure formed by the outwardly extending portion 29 of the base 1 and are, on the exterior of said housing, provided with operating levers 49 which normally rest in lock lever receiving recesses 50 formed in the base 1 so as to be out of the way of the operator of the rotary machine.

In order that the lock levers 49 as resting within the recesses 50 may be easily gripped by the operator, the levers 49 are formed with depending feet 51 which engage the lower wall of the recess to hold the levers 49 up in position where the hand of the operator can be slipped under the levers to actuate the same. Lock pawls 47 are pivotally mounted on the opposite sides of the pinion shaft 28 in the same manner as is shown in the copending application of Faulkner, et al., Serial No. 504,758, for Rotary machine.

In order to provide for the lubrication of the operating parts of my rotary machine and to provide for the continuous lubrication of all the bearings and of all the gears during the operation, I provide an oil pump 52, illustrated as the gear type, although any other suitable type of circulating pump may be employed, which I prefer to locate in the lower part of the base 1 within an oil reservoir 53 formed in the lower portion of the base 1. The pump 52 being the gear type, is driven from gear teeth 54 formed on one face of the lock ring 45. The gear teeth 54 in turn drive a pinion 55 which is directly connected by a shaft 56 with the gears of the geared pump.

An opening 57 is formed through a portion 29 of the base 1 and the sleeve 30 to permit assembly or removal of the pump as desired. A suction inlet for the pump is indicated at 58, and the discharge outlet indicated at 59. The oil pumped from the reservoir 53 by the pump 52 is delivered through the conduit 60 first to the gear table supporting bearing, passing from the conduit 60 through the lubricant passage 61 formed in the portion 29 of the base, and through the cored passage 62 formed in the bearing supporting ring 5.

The oil thus delivered to the main supporting bearing 7 overflows the oil chamber in which the main supporting bearing 7 is situated and passes over the inner wall 10 and is distributed by gravity to the gear ring 16 and the other bearings of the rotary machine. The oil flows over the top of the gear 16 and downwardly into a trough 63 by means of which the oil is conveyed around the base to a point in the base where the oil is directed against the teeth of the pinion 26. As illustrated in Figure 1, the trough 63 is flared on each side of the pinion 26. The inner end of the sleeve 30 is formed at 64 to cooperate with the ends of the trough 63 to convey the oil directly to the teeth formed on the pinion 26. The portions 65 of the sleeve 30 extend over an arc greater than the spacing of the two adjacent gear teeth in order to minimize the amount of oil slippage between the sleeve and the gear pinion at that point. The pinion gear teeth carry the oil upwardly to lubricate the gear and pinion at the point of engagement.

Any oil that flows over the top of the trough 63 drops downwardly into a lower trough 66. The trough 66 also collects a portion of the oil which drops from the gear 16.

A small trough 67 is partitioned off from the trough 66 for the purpose of collecting a small quantity of oil which is supplied to the upthrust bearing 17. This oil passes through a port 68 downwardly between the upstanding wall 3 of the base 1 and the skirt 18 of the table 6 and into the lubricating recess in which the upthrust bearing 17 operates. A dam 69 is formed at the end of the trough 66 to maintain a level of oil in the trough to the top of the dam. Oil is supplied from the trough 66 by gravity to the outer pinion shaft bearing 34 through a passage 70 which is in communication with a longitudinal passage 71 formed in the base casting. As indicated in Figure 8, the passage 71 communicates with the bearing enclosure through a lateral passage 72 formed through the bearing retainer 36, the sleeve 30 and the portion 29 of the base 1. A passage 73 in the bearing retainer 36 connects the recess 74 with the interior of the housing provided by the portion 29 of the base 1 and thereby provides an overflow outlet for the oil within the enclosure for the bearing 34. The oil which is not returned to the reservoir through the passage 70 overflows the dam 69 and returns to the reservoir through the openings 75 and 76 formed in the sleeve 30.

The inner bearing 33 is lubricated by oil flowing downwardly from the gear 16 and the ring 25. In the construction thus described, it is to be observed that the rotary machine is completely and continuously lubricated from a single source which supplies the oil to the main supporting bearing, from which point the oil is delivered by gravity to all of the points requiring lubrication. Oil is supplied to the reservoir 53 through an opening 77 which communicates with the trough 66 through a passage 78. Petcocks 79 are provided to enable the operator to maintain the level of lubricant within the reservoir 53. If desired, the oil could be supplied to the reservoir through the inspection hole which is closed by the plug 80. The reservoir 53 is drained through the opening at 81 by removal of the drain plug threaded in this opening.

In the modified form of construction embodying my invention in which a "hydraulic type rotary machine" is illustrated, as by Figures 9 and 10, 80ᵃ indicates the base which rotatably supports a rotary gear 81ᵃ. The rotary machine as illustrated by Figure 9 is of the general type of construction as is illustrated in the patent to Lewis E. Zerbe, et al., No. 1,876,126, issued September 6, 1932.

The rotary gear 81ᵃ in this structure is supported on a main supporting bearing 82 which is positioned above the rotary gear 81ᵃ. The main supporting bearing 82 is contained within a supporting ring 83 which is secured to the top face of the base by means of screws 84. The rotary gear 81ᵃ has a removable top section 85 to facilitate assembly of the ring 83 and the bearing 82. The top section 85 cooperates with the ring 83 to define an enclosure for the bearing 82 and to provide a labyrinth path to prevent the introduction of rotary mud or other foreign matter into the bearing 82.

An upthrust bearing 86 is positioned below the rotary gear 81ᵃ and is accessible from the under side of the base 80ᵃ. A ring 87 is threaded to an extension of the rotary gear 81ᵃ and holds the bearing 86 in position and also defines an enclosure for the bearing 86. The rotary gear 81ᵃ is driven by a pinion 88 housed within the outwardly extending portion 89 of the base 80ᵃ. The pinion 88 is secured upon a shaft 90. The shaft 90 is rotatably mounted on bearings 91 and 92. The pinion shaft 90 is driven by a bevel gear 93 which is secured to the upper end of the shaft 90. The gear 93 is driven by the pinion 94 secured to the sprocket shaft 95 which extends to the outside of the housing 89 and is in turn driven by a sprocket 96.

A rotary table 97 has a depending sleeve 98 formed with a splined outer contour to engage a complementary splined contour in the bore of the rotary gear 81ᵃ as illustrated at 99. The spline permits of a reciprocating movement of the table 97 independent of the rotation of the table imparted thereto by the drive gear 81ᵃ. The rotary table 97 is rotatably supported by a bearing 100 carried by the horizontal spider 101. The horizontal spider is supported by three vertical piston rods 102. An upthrust bearing 103 is mounted below the spider 101 and is carried by a ring 104 which is threadedly secured to the sleeve 98.

The base 80ᵃ carries three vertical cylinders 105 clamped thereto by bridge pieces 106 secured to the base 80ᵃ. Positioned within the cylinders 105 are pistons 107 which are secured to the piston rods 102. The cylinder head 108 closes the lower end of each cylinder and a stuffing box 109 forms a pressure seal in the upper end of each cylinder. Actuating fluid under pressure may be admitted to either face of the piston 107 through ports 110 or 111 provided at the upper and lower ends of the respective cylinders.

With the construction thus described, the spider 101 and table 97 can be reciprocated under precise regulation by controlling the pressure of the actuating fluid admitted to or exhausted from the cylinders 105.

When the rotary machine shown in Figures 9 and 10 is employed as a conventional rotary machine, the spider 101 rests on top of the cylinders 105 as illustrated at 112.

In order to provide for a greater floor area around the rotary table in the particular position where the operators generally work, I have found it advantageous to position the pinion shaft housing to one side of the outwardly extending portion 98. The positioning of the pinion shaft as shown specifically in Figure 10 results in a shorter drive between the sprocket 96 and the rotary drawworks (not shown). The area made available by positioning the drive in off-center relation is provided with a treaded surface as indicated at 113. The surface 113 is flush with the floor of the derrick.

Having fully described my invention, it is to be understood that I do not wish to be limited to the details herein set forth, but my invention is of the full scope of the appended claims.

I claim:

1. In a rotary machine, the combination of a base, a rotary table rotatably supported by the base, gear means carried by the rotary table, a pinion adapted to mesh with the gear means, a pinion shaft upon which the pinion is secured, the base being formed to provide an enclosure for the pinion shaft and pinion, a housing sleeve for the pinion shaft and pinion adapted to fit within the base enclosure, bearing means interposed between the pinion and the housing sleeve for supporting the inner end of the assembly of pinion and pinion shaft on one side of the pinion, and bearing means interposed between the pinion shaft and housing sleeve on the other side of the pinion and near the outer end of the housing sleeve.

2. In a rotary machine, the combination of a base, a gear table rotatably supported by the base, a gear carried by the gear table, the base being formed to provide an enclosing means, a unitary pinion shaft assembly mounted within the enclosing means to cooperate with the gear of the gear table to drive the gear table relative to the base, said unitary pinion shaft assembly including a pinion, pinion shaft and spaced bearings, and a unitary pinion shaft housing sleeve and the said spaced bearings being interposed between the pinion and a portion of the sleeve at the inner end of said unitary pinion shaft assembly and between the outer end of the sleeve and the pinion shaft.

3. In combination with a rotary machine, a unitary pinion shaft assembly including a pinion, a pinion shaft, a sleeve for enclosing the pinion and pinion shaft, the sleeve being formed at the inner end of the assembly to provide a trunnion, a bearing interposed between the trunnion and the pinion, and a second bearing spaced from the first said bearing for supporting the pinion shaft at a point near the outer end of the sleeve.

4. In a rotary machine, the combination of a base having an upstanding outer wall, a rotary table having a depending extension projecting through an opening in the base, a detachable main bearing supporting ring carried by said outer wall of the base, bearing means including upper and lower race plates positioned between said table and said supporting ring, a gear carried by the table below the main bearing, said table being provided with radially extending flange means having a maximum diameter greater than the maximum effective diameter of said race plates, said flange means, supporting ring and wall of the base cooperating to define an enclosure for said gear and said bearing means, an upthrust bearing means positioned below said gear between the base and the depending extension on said table, said race plates having a maximum effective diameter that is less than the greatest diameter of said gear.

5. In a rotary machine, the combination of a base having an upstanding outer wall, a rotary table having a depending extension projecting through an opening in the base, a bearing supporting ring carried by the outer wall of the base, bearing means positioned between the table and the supporting ring, a gear carried by said table below the main bearing, said table being provided with radially extending flange means, said flange means, supporting ring and wall of the base cooperating to define an enclosure for said gear and said bearing means, upthrust bearing means positioned below said gear between the base and the depending extension on said table, the first said bearing means, the gear and the upthrust bearing means being positioned substantially in alignment in a substantially vertical plane.

6. In a rotary machine, the combination of a base having an upstanding outer wall, a rotary table having a depending extension projecting through an opening in the base, a detachable main bearing supporting ring carried by said outer wall of the base, bearing means positioned between the table and said supporting ring, a gear carried by said table below the main bearing, said table being provided with radially extending flange means, said flange means, supporting ring and wall of the base cooperating to define an enclosure for said gear and said bearing means, an upthrust bearing positioned below said gear between the base and at the lower end of the depending extension of the table, the first said bearing means having a maximum effective diameter that is not materially less than or greater than the greatest diameter of said gear.

7. In a rotary machine, the combination of a base having an upstanding wall, a rotary table having a depending extension projecting through an opening in the base, a detachable main bearing supporting ring carried by the outer wall of the base, bearing means positioned between the table and the supporting ring, a gear carried by the table below the main bearing, said table being provided with radially extending flange means, said flange means, supporting ring and wall of the base cooperating to define an enclosure for the gear and said bearing means, an upthrust bearing means positioned below said gear and the depending extension of the table near the lower end of the table, the effective diameters of the main bearing means and upthrust bearing means being substantially the same as the gear diameter, and the main bearing and upthrust bearing being spaced apart at the opposite ends of said table structure in a vertical plane and formed to accommodate radial thrust imposed by the operation of said table on said bearings.

8. In a rotary machine, the combination of a base having an upstanding outer wall, a rotary table having a depending extension projecting through an opening in the base, a detachable main bearing supporting ring carried by said outer wall of the base, bearing means positioned within an upwardly extending annular channel formed in said ring to rotatably support said table, means carried by the table and cooperating with the supporting ring to define a labyrinth clearance between the ring and the table to resist the entrance of foreign matter into contact with the bearing means, a gear carried by said table below the bearing means, and upthrust bearing means positioned below said gear between the base and the depending extension on said table, said upper and lower bearing means being confined to a maximum effective diameter not exceeding the greatest diameter of said gear.

9. In a rotary machine, the combination of a base having an upstanding outer wall, a rotary table having a depending extension projecting through an opening in the base, a radially extending flange on said table providing a downwardly facing shoulder, a gear carried by said table below said flange, said table, flange and the upper face of said gear cooperating to define a circumferentially extending recess having a substantially cylindrical portion that is less in diameter than the maximum diameter of the gear, a detachable main bearing supporting ring carried by said outer wall of the base and having a bearing supporting portion projecting into said recess, bearing means between said bearing supporting portion of the ring and the downwardly facing shoulder for rotatably supporting said table, said table flange cooperating with the supporting ring to define a labyrinth restriction, and upthrust bearing means positioned below said gear between the base and the depending extension on said table.

10. In a rotary machine, the combination of a base, a rotary table having a depending extension projecting through an opening in the base, a gear carried by said table, down-thrust bearing means carried by the base for rotatably supporting the table, means including a vertically extending annular rim on the base cooperating with the table to form a complete enclosure around the table, gear and bearing means, an upthrust bearing positioned below the plane of said down-thrust bearing means between the base and the table extension, a drive pinion meshing with gear teeth formed on the face of said gear, said pinion being adapted to deliver oil to said gear, said oil falling from said gear and flowing to a reservoir, and means for diverting a limited quantity of the oil falling from said gear and conveying the same to said upthrust bearing.

11. In a rotary machine, the combination of a base, a rotary table having a depending extension projecting through an opening in the base, a gear carried by said table, down-thrust bearing means carried by the base for rotatably supporting the table, means including a vertically extending annular rim on the base cooperating with the table to form a complete enclosure around the table, gear and bearing means, an upthrust bearing positioned below the plane of said down-thrust bearing means between the base and the table extension, a drive pinion meshing with gear teeth formed on the face of said gear, an oil conveying channel formed in said base below said gear and communicating with an oil reservoir, a pocket formed in said base below said gear, said pinion being adapted to deliver oil to said gear, said oil falling from said gear into said channel and pocket, and means to convey the oil diverted into said pocket to said upthrust bearing.

12. In a rotary machine, the combination of a base, a rotary table having a depending extension projecting through an opening in the base, a gear carried by said table, down-thrust bearing means carried by the base and positioned within a channel for rotatably supporting the table, means including a vertically extending annular rim on the base cooperating with the table to form a complete enclosure around the table, gear and bearing means, an upthrust bearing positioned below the plane of said down-thrust bearing means between the base and the table extension, means for supplying said channel with oil from a reservoir formed in said base, said channel being formed to maintain a level of oil around the down-thrust bearing means, said oil overflowing said channel and returning to said reservoir, and means for diverting a limited quantity of the oil overflowing said channel and conveying the same to said upthrust bearing.

13. In a rotary machine, the combination of a base, a rotary table having a depending extension projecting through an opening in the base, bearing means carried by the base and positioned within a channel for rotatably supporting the table, a gear carried by said table below the plane of said bearing means, means including a vertically extending annular rim on the base cooperating with the table to form a complete enclosure around the table, gear and bearing means, a drive pinion meshing with said gear, means to supply oil to the channel from a reservoir formed in the base, said channel being formed to maintain a level of oil around the bearing means, said oil overflowing said channel, and means for intercepting a quantity of the oil overflowing said channel and conveying the same into impinging contact with the teeth on said drive pinion.

14. In a rotary machine, the combination of a base, a rotary table having a depending extension projecting through an opening in the base, bearing means carried by said base for rotatably supporting the table, a gear carried by said table, means including a vertically extending annular rim on the base cooperating with the table to form a complete enclosure around the table, gear and bearing means, a pinion shaft assembly including a shaft and a drive pinion adapted to drive said gear, spaced bearing means for rotatably supporting said assembly, said pinion being adapted to deliver oil to said gear, said oil falling from said gear, and means for intercepting a quantity of the oil falling from said gear and conveying the same to the pinion shaft bearing means farthest removed from the pinion.

15. In a rotary machine, the combination of a base having an upstanding outer wall, a rotary table having a depending skirt extending through an opening in the base, a detachable main bearing supporting ring carried by said outer wall of the base, bearing means positioned within an annular channel formed in said ring to rotatably support said table, means carried by the table and cooperating with means on the supporting ring to define a labyrinth clearance between the ring and the table to resist the entrance of foreign matter into contact with the bearing means, a gear carried by said table below the bearing means, a drive pinion meshing with gear teeth formed on the lower face of said gear, upthrust bearing means positioned below said gear between the base and the depending skirt on said table, a lubricant circulating system within said rotary machine, said system including means for circulating lubricant from a reservoir to the bearing means within the ring channel, means to catch a quantity of the lubricant overflowing said channel and convey said lubricant into impinging contact with the teeth on the drive pinion, and means for intercepting a limited quantity of the lubricant circulating within said system and conveying said lubricant to said upthrust bearing means.

16. In a rotary machine, the combination of a base having a vertically extending opening therein, and having an outwardly extending pinion shaft supporting portion, a rotary table rotatably mounted in said opening, a gear on said table, a unitary bearing housing, means to support said housing on the pinion shaft supporting portion of the base, means to detachably secure said housing on the base, a pair of axially spaced bearing means carried by said housing in axial alignment, a pinion shaft assembly rotatably supported by said bearing means, said pinion shaft assembly including a shaft and a drive pinion positioned between said bearings and adapted to drive the gear on the table, and means to drive said shaft.

17. In a rotary machine, the combination of a base having a vertically extending opening therein, and having an outwardly extending pinion shaft supporting portion, a rotary table rotatably mounted in said opening, a gear on said table, a unitary bearing housing, means to detachably secure said housing on the table, a pair of axially spaced bearing means carried by said housing in axial alignment, a pinion shaft assembly rotatably supported by said bearing means, said pinion shaft assembly including a shaft and a drive pinion positioned between said bearings and adapted to drive the gear on the table, means to drive the shaft, and means to support the bearing housing on the pinion shaft supporting portion of the base at points substantially corresponding to the spacing of the bearing means.

18. In a rotary machine, the combination of a base, a rotary table rotatably supported by the base, gear means carried by the rotary table, a pinion shaft assembly including a shaft and a drive pinion which is adapted to mesh with the gear means, the base being formed to provide an enclosure for the pinion shaft assembly, a housing sleeve for the pinion shaft assembly adapted to fit within the base enclosure, spaced bearing means interposed between the pinion shaft assembly and the housing sleeve, said pinion being positioned between said spaced bearing means.

19. In a rotary machine, the combination of a base, a rotary table supported by said base, a pinion shaft, means whereby said pinion shaft drives said table, a housing supported by said base, bearing means for said shaft carried by said housing, a lock means mounted on said shaft within the housing, co-acting means within the housing to engage the lock means and hold the pinion shaft from rotation, and means extending through said housing for actuating the co-acting means from the exterior of said housing, said latter means including a lever positioned when in the inoperative position in a recess formed in the base, the exposed portion of said lever being substantially flush with the surrounding surface of the base.

20. In a rotary drilling machine, a base having a vertical opening, a detachable main bearing supporting ring carried by said base adjacent the upper end of said opening, a rotary member having a gear, said member having a depending extension positioned below said ring in said opening, means including a bearing carried by said ring for rotatably supporting said gear, radially extending flange means carried by said rotary member and cooperating with the supporting ring to define a labyrinth restriction, an upthrust bearing positioned below said gear between the base and the depending extension on said member, said bearings being confined to a maximum diameter not exceeding the greatest diameter of the gear, a sleeve splined to the gear member and positioned in the opening, means for elevating the sleeve, controlling its descent and maintaining it at any selected position, a well drilling table secured to the top of said sleeve, and means for rotating the gear.

21. In a rotary machine, the combination of a base, a rotary table having a depending extension projecting through an opening in the base, bearing means carried by said base for rotatably supporting the table, a gear carried by said table, means including a vertically extending annular rim on the base cooperating with the table to form a complete enclosure around the table, gear and bearing means, a pinion shaft assembly including a shaft and a drive pinion adapted to drive said gear, drive means to drive said shaft, bearing means positioned between said pinion and drive means to rotatably support said shaft, said pinion being adapted to deliver oil to said gear, said oil falling from said gear, and means for intercepting a quantity of the oil falling from said gear and conveying the same through channel means to said pinion shaft bearing means 22. In a rotary machine, the combination of a base having an upstanding outer wall, a rotary table having a depending extension projecting through an opening in the base, a detachable bearing supporting ring carried by said outer wall of the base, bearing means positioned between said table and said supporting ring, a plurality of bolts to secure said ring to said base, a gear carried by said table below the main bearing, and means carried by the table for enclosing the exposed portions of said bolts above the ring.

23. In a rotary machine, the combination of a base, a rotary member having a gear mounted axially of an opening in the base, means including a wall carried by the base to enclose said gear, a main supporting bearing for said rotary member carried by the said wall and positioned above the horizontal plane of said gear for rotatably supporting the gear on the base, an upthrust bearing for said rotary member positioned below the horizontal plane of said gear to rotatably support the gear against upthrust loads, the main supporting and upthrust bearings having an effective bearing diameter less than the largest diameter of the gear, a removable thrust supporting member operatively interposed between the base and one of said bearings, radially extending flange means having an effective diameter greater than that of the adjacent bearing carried by said rotary member and cooperating with the supporting member to define a labyrinth restriction, and means to detachably secure said supporting member to the base.

24. In a rotary machine for drilling wells, the combination of a base, a rotary gear rotatably supported by the base, a unitary pinion shaft assembly for driving the rotary gear, said assembly including a pinion for driving the rotary gear, a pinion shaft and spaced bearings for supporting the shaft, said bearings being positioned upon opposite sides of said pinion, and means for supporting said bearings in position, said unitary pinion shaft assembly including said spaced bearings, pinion shaft, pinion and bearing support being assembled as a unit and removable from position with reference to said rotary gear as a unit.

25. In a rotary machine for drilling wells, the combination of a base, a rotary gear rotatably supported by said base, means including a drive pinion and a shaft adapted to drive said gear, means for supporting said pinion and shaft in position relative to said rotary gear, said means including axially spaced bearings for rotatably supporting said shaft, the drive pinion being positioned between the axially spaced bearings and the pinion shaft, axially spaced bearings, and said supporting means being removable from the base as a unit.

26. In a rotary machine for drilling wells, the combination of a base having an upstanding wall, a rotary gear rotatably supported by said base, means including a drive pinion and a shaft adapted to drive said rotary gear, the wall of the base having an opening therein through which said pinion is insertable, means to close the opening in the base and cooperating with the base to provide an enclosure for the pinion and pinion shaft, axially spaced bearings for rotatably supporting the pinion and shaft, the pinion being positioned between the spaced bearings, and means to support the bearings in axial alignment on the base, said latter means being removable from the base upon withdrawal of the pinion, shaft and bearings therefrom.

JOHN D. SPALDING.